United States Patent [19]

Shirahata et al.

[11] 3,993,824
[45] Nov. 23, 1976

[54] RECORDING MEMBER COMPRISING A SUBSTRATE WITH A MAGNETIC LAGER ON ONE SURFACE AND A LUBRICATING LAGER ON THE OPPOSED SURFACE

[75] Inventors: Ryuji Shirahata; Yasuyuki Yamada; Tatsuji Kitamoto, all of Odawara, Japan

[73] Assignee: Fuji Photo Film Co., Ltd., Minami-ashigara, Japan

[22] Filed: Feb. 18, 1975

[21] Appl. No.: 550,685

[30] Foreign Application Priority Data
Feb. 15, 1974 Japan............................ 49-18377

[52] U.S. Cl. ........................... 428/216; 427/130; 427/131; 428/336; 428/339; 428/457; 428/900

[51] Int. Cl.² .................... B32B 5/00; B32B 27/18; G03G 5/10; G03G 14/00

[58] Field of Search ........... 427/128, 129, 130, 131, 427/132; 428/900, 336, 458, 339, 216, 461, 463, 464, 457

[56] References Cited
UNITED STATES PATENTS

| | | | |
|---|---|---|---|
| 2,654,681 | 10/1953 | Lueck | 428/900 |
| 3,274,111 | 9/1966 | Sader et al. | 428/900 |
| 3,276,946 | 10/1966 | Cole et al. | 428/900 |
| 3,293,066 | 12/1966 | Haines | 428/458 |
| 3,387,993 | 6/1968 | Flowers | 428/900 |
| 3,398,011 | 8/1968 | Neirotti et al. | 427/131 |
| 3,466,156 | 9/1969 | Peters et al. | 427/131 |
| 3,542,589 | 11/1970 | Hartmann et al. | 427/128 |
| 3,547,693 | 12/1970 | Huguenard | 428/900 |
| 3,617,378 | 11/1971 | Beck | 428/336 |
| 3,630,772 | 12/1971 | Seidel | 428/900 |
| 3,634,253 | 1/1972 | Akashi | 428/900 |
| 3,649,541 | 3/1972 | Ingersoll | 428/900 |
| 3,650,828 | 3/1972 | Higashi | 428/900 |
| 3,734,772 | 5/1973 | Schnell et al. | 428/900 |
| 3,833,412 | 9/1974 | Akashi et al. | 428/900 |
| 3,881,046 | 4/1975 | Akashi et al. | 428/900 |

*Primary Examiner*—J.C. Cannon
*Attorney, Agent, or Firm*—Sughrue, Rothwell, Mion, Zinn & Macpeak

[57] ABSTRACT

A magnetic recording member comprising a non-magnetic support having a magnetic recording layer on one side of the non-magnetic support and a lubricating layer on the other side of the non-magnetic support in which the lubricating layer comprises a liquid or semi-solid lubricant or a liquid or semi-solid lubricant, and an organic binder.

10 Claims, No Drawings

RECORDING MEMBER COMPRISING A SUBSTRATE WITH A MAGNETIC LAGER ON ONE SURFACE AND A LUBRICATING LAGER ON THE OPPOSED SURFACE

BACKGROUND OF THE INVENTION

1. Field of the Invention

The present invention is directed to the reduction of friction between a magnetic recording layer and a magnetic head. More particularly, the present invention relates to a ferromagnetic magnetic recording member including a lubricating layer containing a liquid or semi-solid lubricant on one side of the recording member.

2. Description of the Prior Art

Hitherto, a magnetic recording member produced by dispersing a powdery magnetic material such as $\gamma$-$Fe_2O_3$, Co containing $\gamma$-$Fe_2O_3$, $CrO_2$, or an alloy powder in an organic binder and coating the resulting composition on a support has been used. Recently, however, a magnetic recording member produced without using any binder by electroplating, electroless plating, sputtering, vacuum deposition, ion plating, or the like, i.e., of the so-called non-binder type, has attracted public attention.

As one of the requirements for a magnetic recording member for use in high density recording, it has been theoretically and experimentally proposed to obtain higher coercive force by rendering the thickness of the magnetic recording layer thinner. Thus, great hopes have been placed on non-binder type magnetic recording members and efforts have been directed toward the practical use of such a magnetic recording member because with the non-binder type magnetic recording member, the thickness can be easily decreased by a factor of 10 as compared with a coating type magnetic member and a non-binder type magnetic recording member has higher saturation magnetization.

However, serious problems are raised with a non-binder type thin film magnetic recording member with respect to corrosion, impact-strength, and frection-strength. Namely, a magnetic recording member and a magnetic head are moved relative to each other in the course of recording a magnetic signal, and reproduction and erasure, and thus there is a fair possibility for the magnetic recording member to be subjected to friction and breakage due to the contact of the magnetic recording member with the magnetic head.

Prior art magnetic recording members produced by techniques such as plating, vapor-depositing, ion plating, and the like tend to be damaged when contacted with the magnetic head and the magnetic recording layer is scraped off because the recording member does not contain any binder. A method of coating a polymer film having a thickness on the order of 2 $\mu$m has been proposed, but it has been found that this method is not desirable since the output is decreased in high speed recording.

SUMMARY OF THE INVENTION

Thus, an object of the present invention is to provide a magnetic recording member which has excellent durability.

Another object of the present invention is to provide a non-binder type magnetic recording member which has excellent durability.

It has now been found that by providing a thin coating of a lubricant on the surface of a tape, the friction between the magnetic head and the magnetic recording thin film is reduced and the magnetic recording member is damaged only with difficulty.

Accordingly, the magnetic recording member of this invention comprises a non-magnetic support having a magnetic recording layer on one side of the support and on the other side of the support a lubricating layer which contains a liquid or semi-solid lubricant and which is capable of supplying the lubricant quite gradually to the surface of the magnetic recording layer. Thus, when the support is wound in a roll form, the lubricant which has oozed from the lubricating layer is transferred to the surface of the magnetic recording layer, and the lubricant is always supplied to the surface of the magnetic recording layer.

DETAILED DESCRIPTION OF THE INVENTION

As described above, the present invention provides a magnetic recording member comprising a non-magnetic support having a magnetic recording layer on one side of the non-magnetic support, and a lubricating layer on the other side of the non-magnetic support. The lubricating layer can comprise in one embodiment a binder layer containing a liquid or semi-solid lubricant dispersed therein or in another embodiment can comprise a layer of a liquid or semi-solid lubricant held in pores of a porous non-magnetic support. The appropriate embodiment can be chosen by one skilled in the art based on the nature of the support surface (i.e., whether porous or smooth) to which the lubricant layer is to be provided.

The thickness of the lubricating layer containing an organic binder after coating and drying ranges from about 1 to about 10 $\mu$m and a suitable thickness for the lubricating layer comprising the liquid or semi-solid lubricant is less than about 1000 A, preferably 50 to 500 A. Suitable liquid or semi-solid lubricants are those which are liquid or semi-solid at normal temperature (e.g., 20°–30° C) and include silicone oils such as dimethylpolysiloxane, diethylpolysiloxane, and the like, fluorinated hydrocarbons such as trifluorochloroethylene, and the like, aliphatic acid esters of aliphatic monocarboxylic acids containing about 12 to 16 carbon atoms and monohydric alcohols containing about 3 to 12 carbon atoms, aliphatic acid esters of aliphatic monocarboxylic acids containing 17 or more carbon atoms and monohydric alcohols, the total number of carbon atoms of which ester ranges from about 21 to 23, and the like, such as amyl stearate, amyl oleate, and the like. In addition, paraffin, liquid paraffin, Vaseline, mineral oils such as greases, higher alcohols such as hexyl alcohol, octyl alcohol, cetyl alcohol, ceryl alcohol, stearyl alcohol, myristyl alcohol, and the like, glycols such as ethylene glycol, propylene glycol, trimethylene glycol, 1,4-butanediol, 1,5-pentanediol, and the like, various surface active agents, and the like can be used individually or in mixtures comprising two or more thereof.

Suitable surface active agents include natural surface active agents such as saponin, and the like; nonionic surface active agents such as alkylene oxide based, glycerol based, glycidol based surface active agents, or the like; cationic surface active agents such as higher alkylamines, quaternary ammonium salts, heterocyclics, e.g., pyridine, phosphonium compounds, sulfonium compounds, and the like; anionic surface active agents containing acidic groups such as carboxylic acids, sulfonic acid, phosphoric acid, sulfuric acid ester, phosphoric acid ester, and like groups; and amphoteric surface active agents such as amino acids, aminosulfonic acids, sulfuric acid or phosphoric acid esters of aminoalcohols, and the like.

Examples of surface active agents which can be used herein are described in U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174, 4,545,974, West German patent application (OLS) No. 1,942,665; British Pat. Nos. 1,077,317, 1,198,450; R. Oda, et al., *Synthesis of Surface Active Agents and Application Thereof*, published by Maki Shoten (1964); A. W. Perry, *Surface Active Agents*, Interscience Publications Incorporated (1958); T. P. Sisley, *Encyclopedia of Surface Active Agents*, Vol. 2, Chemical Publishing Co., (1964); *Kaimen Kaseizai Binran* (*Handbook of Surface Active Agents*), 6th Edition, Sangyo Tosho Co., (Dec. 20, 1966); etc.

These surface active agents can be used individually or in combination with each other. They are used as a lubricant, but in some cases they are used as an agent for improving dispersion properties or magnetic properties, as an antistatic agent, and as an auxilliary coating agent.

Suitable binders include thermoplastic resins and thermosetting resins, and mixtures thereof. These are well known and have been hitherto employed for a magnetic recording members.

Suitable thermoplastic resins are those resins which have a softening point of about 150° C or less, an average molecular weight of about 10,000 to 200,000, and a degree of polymerization of about 200 to 2,000, e.g., a vinyl chloride-vinyl acetate copolymer, a vinyl chloride-vinylidene chloride copolymer, a vinyl chloride-acrylonitrile copolymer, an acrylic acid ester-acrylonitrile copolymer, an acrylic acid ester-styrene copolymer, a methacrylic acid ester-acrylonitrile copolymer, a methacryic acid ester-vinylidene chloride copolymer, a methacrylic acid ester-styrene copolymer, a urethane elastomer, a polyvinyl fluoride resin, a vinylidene chloride-acrylonitrile copolymer, a butadiene-acrylonitrile copolymer, a polyamide resin, polyvinyl butyral, cellulose derivatives such as cellulose acetate butyrate, cellulose diacetate, cellulose triacetate, cellulose propionate, nitrocellulose, and the like, a styrene-butadiene copolymer, a polyester resin, a chloro vinyl ether-acrylic acid ester copolymer, an amino resin, various synthetic rubber based thermoplastic resins, mixtures thereof, and the like.

These resins are described in Japanese patent publication Nos. 6877/1962, 12528/1964, 19282,1964, 5329/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972, 27886/1972, U.S. Pat. Nos. 3,144,352, 3,419,420, 3,499,789, 3,713,887, etc.

Suitable thermosetting resins have a molecular weight of about 200,000 or less as a coating solution, and when heated after coating and drying, the molecular weight becomes infinity due to reactions such as condensation, addition, and the like. Of these resins, those resins are preferred which do not soften or melt before the resins thermally decompose. Representative examples of these resins are a phenol resin, an epoxy resin, a polyurethane hardening type resin, a urea resin, a melamine resin, an alkyd resin, a silicone resin, an acryl based reactive resin, an epoxypolyamide resin, a nitrocellulose-melamine resin, a mixture of a high molecular weight polyester resin and an isocyanate prepolymer, a mixture of a methacrylic acid salt copolymer and a diisocyanate prepolymer, a mixture of a polyesterpolyol and a polyisocyanate, a urea formaldehyde resin, a mixture of a low molecular weight glycol, a high molecular weight diol, and triphenylmethane triisocyanate, a polyamine resin, mixtures thereof, and the like.

These resins are described in Japanese patent publication Nos. 8103/1964, 9779/1965, 7192/1966, 8016/1966, 14275/1966, 18179/1967, 12081/1968, 28023/1969, 14501/1970, 24902/1970, 13103/1971, 22065/1972, 22066/1972, 22067/1972, 22072/1972, 22073/1972, 28045/1972, 28048/1972, 28922/1972, U.S. Pat. Nos. 3,144,353, 3,320,090, 3,437,510, 3,497,273, 3,781,210, 3,781,211, etc.

These binders can be used individually or in combination with each other, and other additives can be employed.

Examples of additives which can be employed are dispersing agents and the like.

Suitable dispersing agents are fatty acids containing about 12 to 18 carbon atoms (e.g., having the formula $R_1COOH$ wherein $R_1$ is an alkyl group containing about 11 to 17 carbon atoms), e.g., caprylic acid, capric acid, lauric acid, myristic acid, palmitic acid, stearic acid, oleic acid, elaidic acid, linolic acid, linolenic acid, stearolic acid, and the like; metallic soaps comprising the alkali metal (Li, Na, K, etc.) salts or the alkaline earth metal (Mg, Ca, Ba, etc.) salts of the above described fatty acids; and lecithin, etc. In addition, higher alcohols containing about 12 or more carbon atoms and the sulfuric acid esters thereof can be used. These dispersing agents are generally used in a proportion of about 1 to 20 parts by weight per 100 parts by weight of the binder.

These dispersing agents are described in Japanese patent publication Nos. 28369/1964, 17945/1969, 15001/1973, U.S. Pat. Nos. 3,387,993, 3,470,021, etc.

A filler is incorporated to increase the lubricating property under special conditions where the maintenance of the lubricating layer is quite difficult and to increase the volume. Various kinds of fillers can be used and generally fine powders of graphite, asbestos, mica, zinc, zinc oxide, calcium oxide, calcium carbonate, red iron oxide, silica, talc, carbon black, molybdenum sulfide (IV), chromium oxide (III), titanium oxide, alumina, and the like are used. The average particle size of the filler generally ranges from about 0.1 to 10 $\mu$m, preferably 0.3 to 6 $\mu$m. The ratio of the binder to the filler is about 20:100 to 80:100. The amount of the liquid or semi-solid lubricant employed is about 1 to 15%, preferably about 4 to 10%, by weight to the total weight of the lubricating layer.

When the amount of the lubricant is less than about 1% by weight, the effect of the lubricating layer is small, while when the amount is greater than about 15% by weight, the durability of the lubricating layer itself is reduced.

The above described liquid or semi-solid lubricant and additional components such as binder, filler etc.

are dissolved or dispersed in an organic solvent and coated as a coating solution on the opposite surface of the support to the ferromagnetic magnetic recording layer to produce the lubricating layer.

Ferromagnetic materials which can be used in the present invention, are ferromagnetic metals such as iron, cobalt, nickel, and the like; magnetic alloys such as Fe—Co, Fe—Ni, Co—Ni, Fe—Rh, Fe—Cu, Fe—Au, Co—Cu, Co—Au, Co—Y, Co—La, Co—Pr, Co—Gd, Co—Sm, Co—Pt, Ni—Cu, Fe—Co—Nd, Mn—Bi, Mn—Sb, Mn—Al, and the like; and ferrite magnetic substances such as Ba ferrite, Sr ferrite, and the like. Suitable processes which can be used to produce the thin ferromagnetic magnetic recording layer on the support include electroplating as disclosed in U.S. Pat. Nos. 3,227,635, 3,267,017, 3,362,893, 3,578,571, 3,637,471, 3,672,968, etc.; electroless plating as disclosed in U.S. Pat. Nos. 3,116,159, 3,138,479, 3,219,471, 3,238,061, 3,353,986, 3,360,397, 3,416,932, 3,446,657, 3,549,417, etc.; vacuum deposition as disclosed in U.S. Pat. Nos. 2,671,034, 3,342,632, 3,342,633, 3,516,860, 3,700,500, 3,775,179, 3,787,237, etc.; sputtering as disclosed in U.S. Pat. Nos. 3,615,911, 3,625,849, etc.; ionplating as disclosed in U.S. Pat. Nos. 3,329,601, 3,772,174, etc.; and the like.

The thickness of the ferromagnetic thin film should be such that a sufficient output can be obtained and high density recording can be achieved sufficiently. Thus, the thickness of the ferromagnetic thin film is generally about 0.05 to 1.0 $\mu$, preferably about 0.1 to 0.4 $\mu$.

Solvents which can be used in coating the lubricating layer, are ketones such as acetone, methyl ethyl ketone, methyl isobutyl ketone, cyclohexanone, and the like; alcohols such as methanol, ethanol, propanol, butanol, and the like; esters such as methyl acetate, ethyl acetate, butyl acetate, ethyl lactate, glycol monoethyl ether acetate, and the like; glycol ethers such as diethyl ether, glycol monoethyl ether, glycol dimethyl ether, dioxane, and the like; aromatic hydrocarbons such as benzene, toluene, and the like; chlorinated hydrocarbons, e.g., methylene chloride, ethylene chloride, carbon tetrachloride, chloroform, ethylene chlorohydrin, dichlorobenzene, and the like; etc.

The above described lubricating layer can be coated on the support using air doctor coating, blade coating, air knife coating, squeeze coating, dip coating, reverse roll coating, transfer roll coating, gravure coating, kiss coating, cast coating, spray coating, or the like. Other coating methods can be employed. These methods are described in *Coating Kogaku* (*Coating Engineering*), pages 253 to 277, published by Asakura Shoten (Mar. 20, 1971).

The thickness of the support is about 2.5 to 100 $\mu$m and is preferably about 3 to 40 $\mu$m. Suitable non-magnetic supports are polyethylene terephthalate, polyethylene naphthalate, and the like; polyolefins, e.g., polypropylene, and the like; cellulose derivatives, e.g., cellulose triacetate, cellulose diacetate, and the like; vinyl based resins, e.g., polyvinyl chloride, and the like; plastics such as polycarbonate, polyimide, polyamideimide, nylon, and the like; and in addition, metals such as aluminum, copper, and the like; etc. can be used.

The effect of the lubricating layers prepared in the following examples was measured using the methods as described below.

1. A magnetic recording member was contacted with a magnetic head under a load of 90 g and was subjected to 50 reciprocations to measure the durability (scratching and peeling) of the magnetic recording member.

2. Before and after the above 50 reciprocations, the kinetic friction coefficient ($\mu$m) was measured to determine the change in the kinetic friction coefficient.

The following examples are given to illustrate the present invention in greater detail. Unless otherwise indicated, all parts, percents, ratios and the like are by weight.

EXAMPLE 1

I. Plating Stage

A cobalt-phosphorus magnetic layer was provided on a polyethylene terephthalate support of a thickness of 25 $\mu$m and a width of ½ inch by the following electroless plating.

1. Alkali Etching: Sodium hydroxide aqueous solution-5 mole/liter 80° C, 10 minutes
2. Water-washing
3. Sensitizing

| | |
|---|---|
| $SnCl_2 . 2H_2O$ | 10 g |
| HCl | 30 ml |
| Contained in 1 liter of sensitizing liquid. | |

4. Water-washing
5. Activating

| | |
|---|---|
| $PdCl_2$ | 0.25 g |
| HCl | 10 ml |
| Contained in 1 liter of activating liquid. | |

6. Water-washing
7. Electroless Plating

| Composition of Plating Liquid | |
|---|---|
| $CoCl_2 . 6H_2O$ | 9.5 g/liter |
| $NaH_2PO_2 . H_2O$ | 5.3 g/liter |
| $NH_4Cl$ | 10.7 g/liter |
| Citric Acid | 26.5 g/liter |
| Boric Acid | 30.9 g/liter |
| Plating Conditions | |
| pH: 7.5; liquid temperature: 80° C; | |
| plating time: 5 minutes | |

8. Water-washing and Drying

A magnetic recording layer of a film thickness of 0.20 $\mu$m, with a coercive force of 520 oe and a squareness ratio of 0.75, was obtained.

II. Coating Stage

On the opposite surface of the support having the above magnetic recording layer thereon was coated the following composition, which was fully dispersed in a ball mill, in a dry thickness of 2 $\mu$m.

| | Parts |
|---|---|
| Vinyl Chloride-Vinyl Acetate Copolymer | 100 |
| Carbon Black | 200 |
| Silicone Oil (dimethylpolysiloxane; Sg (25° C): 0.95; viscosity: 98 centistokes) | 12 |
| Aliphatic Ester (Amyl Stearate) | 5 |
| Lecithin | 1 |
| Methyl Isobutyl Ketone-Methyl Ethyl | 800 |

-continued

| | Parts |
|---|---|
| Ketone (1:1 by weight) | |

III. Preparation of Sample

The sample, having a lubricating layer was designated No. 11, while the sample, not having the lubricating layer was designated No. 12.

EXAMPLE 2

I. Plating Stage

As in Example 1, electroless plating was applied on a polyethylene terephthalate support. The plating was the same as that in Example 1 except that a catalyst liquid and an accelerating liquid having the following compositions were used in place of the sensitizer and activating liquid.

| Catalyst Liquid | |
|---|---|
| PdCl$_2$ | 1 g |
| Na$_2$SnO$_3$ . 3H$_2$O | 1.5 g |
| SnCl$_2$ . 2H$_2$O | 37.5 g |
| HCl | 300 ml |
| Water to make | 1 liter |
| Accelerating Liquid | |
| HClO$_4$ Liquid (70% by weight aq. soln.) | |
| Electroless Plating | |
| Composition of Plating Liquid | |
| CoSO$_4$ . 7H$_2$O | 14.0 g/liter |
| NaH$_2$PO$_4$ . H$_2$O | 21.2 g/liter |
| Sodium Tartrate | 115.4 g/liter |
| Boric Acid | 30.9 g/liter |
| Plating Conditions | |
| pH: 9.0; Liquid temperature: 90° C; plating time: 3 minutes | |
| Water-washing and Drying | |

A magnetic recording layer of thickness of 0.15 μm, a coercive force of 880 oe, and a squareness ratio of 0.70 was obtained.

II. Coating Stage

The following composition was fully dispersed in a ball mill and coated in a dry thickness of 2 μm on the opposite surface of the support having thereon the above prepared magnetic recording layer.

| | Parts |
|---|---|
| Nitrocellulose | 80 |
| Polybutylacrylate | 20 |
| Dibutyl Phthalate | 20 |
| Talc Powder | 300 |
| Silicone Oil (as described in Example 1) | 10 |
| Fluorocarbon Oil (trifluorochloroethylene) | 8 |
| Lecithin | 2 |
| Methyl Isobutyl Ketone-Methyl Ethyl Ketone (1:1 by weight) | 800 |

III. Preparation of Samples

The sample having the lubricating layer in accordance with the present invention was designated No. 21, and the sample not having the lubricating layer was designated No. 22.

EXAMPLE 3

I. Depositing Stage

A polyethylene terephthalate support of a thickness of 25 μm and a width of ½ inch was run in a vacuum of $5.0 \times 10^{-6}$ Torr in such a manner that the surface of the support was at an angle of 50° relative to an vaporative source, and an alloy of Co—Ni (75:25 by weight) was deposited on the base.

A magnetic thin film of a thickness of 0.2 μm and having lengthwise magnetic properties of a coercive force of 400 oe and a squareness ratio of 0.80 was obtained.

II. Coating Stage

On the opposite surface of the support to the above magnetic recording layer was coated the composition of Example 1 in which titanium oxide-calcium carbonate (1:1 by weight) and oleic acid were used in place of the carbon black and the amyl stearate, respectively, to provide a lubricating layer of a dry thickness of 2 μm.

III. Preparation of Sample

The sample having the lubricating layer in accordance with the present invention was designated No. 31, and the sample not provided having the lubricating layer was designated No. 32.

EXAMPLE 4

I. Plating Stage

The same procedure relative to the Plating Stage (I) of Example 2 were conducted.

II. Coating Stage

A lubricating solution prepared by dissolving silicone oil (as described in Example 1) in a mixture of methanol-toluene in proportion of 1:1 by weight such that the silicone oil concentration was 50% by weight was coated on the opposite surface of the support having the magnetic recording layer thereon in an amount of 7 g/m².

III. Preparation of Sample

The sample having the lubricant layer thereon accordance with the present invention was designated No. 41.

With Samples No. 11, No. 12, No. 21, No. 22, No. 31, No. 32 and No. 41 prepared in Examples 1 to 4 above, the durability of the magnetic recording layer and the change in the kinetic friction coefficient were measured and the results obtained are shown in Table 1.

Table 1

| | | Change in Kinetic Friction Coefficient (μm) | |
|---|---|---|---|
| Sample | Durability after 50 Reciprocations (scratches and peeling) | Initial | After 50 reciprocations |
| No. 11 | No scratches observed Slight loss of plating film | 0.32 | 0.31 |
| No. 12 | A number of deep scratches observed About 40% of plated film was removed | 0.32 | 0.48 |

Table 1-continued

| Sample | Durability after 50 Reciprocations (scratches and peeling) | Change in Kinetic Friction Coefficient ($\mu$m) | |
|---|---|---|---|
| | | Initial | After 50 reciprocations |
| No. 21 | A few stripes of shallow scratches | 0.34 | 0.35 |
| No. 22 | A number of deep scratches About 50% of plated film was removed | 0.34 | 0.50 |
| No. 31 | A few stripes of shallow scratches About 10% of deposited film was removed | 0.35 | 0.35 |
| No. 32 | A number of deep scratches About 70% of deposited film was removed | 0.35 | 0.67 |
| No. 41 | A few stripes of shallow scratches Slight loss of plated film | 0.35 | 0.33 |

It can be understood from the above results that a magnetic recording member having a lubricating layer is superior to a recording member not containing a lubricating layer in durability of the magnetic recording layer after 50 reciprocations and in the change in kinetic friction coefficient.

While the invention has been described in detail and with reference to specific embodiments thereof, it will be apparent to one skilled in the art that various changes and modifications can be made therein without departing from the spirit and scope thereof.

What is claimed is:

1. A magnetic recording member comprising a non-magnetic support having a magnetic recording layer on one surface of said non-magnetic support and a lubricating layer on the other surface of said non-magnetic support, said lubricating layer comprising a liquid or semi-solid lubricant or a liquid or semi-solid lubricant and an organic binder.

2. The magnetic recording member according to claim 1, wherein the magnetic recording layer comprises a non-binder type metal thin film provided by electroplating, electroless plating, sputtering, vacuum depositing, or ion plating.

3. The magnetic recording member according to claim 1, wherein the thickness of the magnetic recording layer is about 0.05 to 1.0 $\mu$m.

4. The magnetic recording member according to claim 3, wherein the magnetic recording member contains as the major component at least one metal selected from the group consisting of Fe, Co, and Ni.

5. The magnetic recording member according to claim 4, wherein the magnetic recording member further contains at least one element selected from the group consisting of B, Al, P, Sc, Ti, V, Cr, Mn, Cu, Zn, As, Se, Y, Mo, Rh, Cs, Ba, La, Ce, Pr, Nd, W, Re, Ir, Pb, and Bi.

6. The magnetic recording member according to claim 1, wherein the thickness of the lubricating layer is less than about 1000 A or about 1 to 10 $\mu$m when said organic binder is present.

7. The magnetic recording member according to claim 6, wherein the lubricating layer comprises said lubricant and said binder and includes a filler and wherein the filler and the binder are present in the lubricating layer in a weight ratio of about 100:20 to 100:80 of the filler to the binder.

8. The magnetic recording member according to claim 6, wherein the amount of the lubricant is about 1 to 15% by weight of the total weight of the filler and binder.

9. The magnetic recording member according to claim 1, wherein the lubricating layer further contains a dispersing agent.

10. The magnetic recording member of claim 1 wherein said member is a magnetic recording tape capable of being wound into a roll and said liquid or semi-solid lubricant is transferred to the surface of the magnetic recording layer during winding operation.

* * * * *